(No Model.)
E. A. SPERRY.
TROLLEY WIRE SPLICE.
No. 478,140. Patented July 5, 1892.
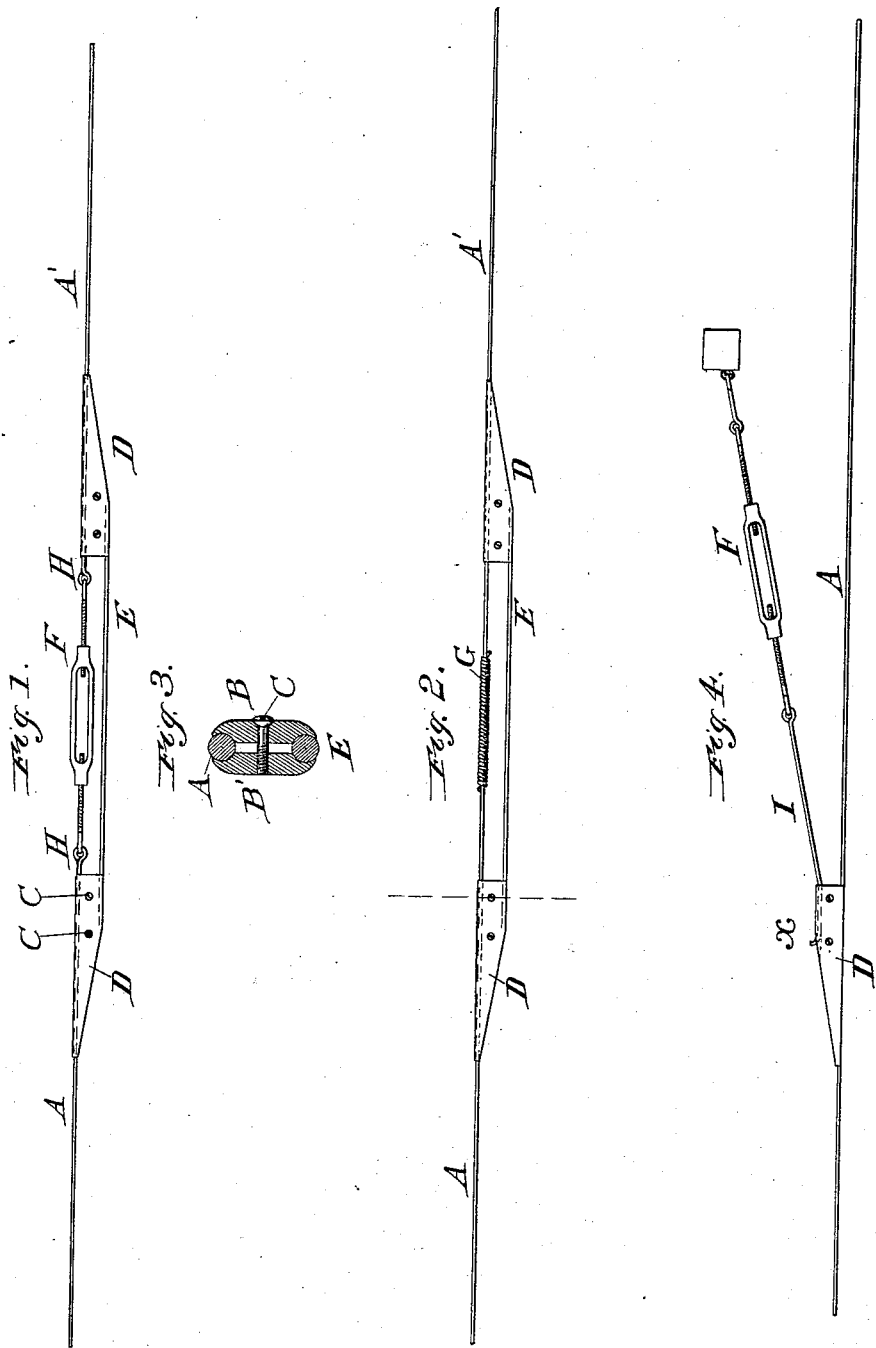

UNITED STATES PATENT OFFICE.

ELMER A. SPERRY, OF CHICAGO, ILLINOIS.

TROLLEY-WIRE SPLICE.

SPECIFICATION forming part of Letters Patent No. 478,140, dated July 5, 1892.

Application filed April 18, 1892. Serial No. 429,571. (No model.)

*To all whom it may concern:*

Be it known that I, ELMER A. SPERRY, a citizen of the United States, residing at Chicago, in the county of Cook and State of Illinois, have invented a new and useful Improvement in Trolley-Wire-Splicing Bridges, of which the following is a full, clear, and exact specification.

My invention relates to trolley-wire devices; and it consists in a system of trolley-wire clamps and devices which may be used as hereinafter specified and are useful for increasing the facility with which wires may be tightened, reconnected when broken and supported. These devices are illustrated in the accompanying drawings, in which—

Figures 1 and 2 are side elevations of the bridge. Fig. 3 is a sectional view; Fig. 4, a view when used as support.

Similar letters of reference indicate like parts throughout the specification.

The trolley-wire A A' is clamped by two side cheeks B and B', forming, with the screws C, the clamp D. The clamp is wedge-shaped and serves to support the bridge-wire E, along which the trolley passes the turnbuckle F or -wire joint G. Figs. 1 and 2 illustrate where the bridge is used to bridge a splice in the trolley-wire. The ends of the trolley-wire are bent up in loops, (shown at H H,) to which the turnbuckle is attached. As the turnbuckle draws the wire up from time to time the clamps D find themselves near together and the removable wire E is cut off; or by loosening the screws C the clamp may be allowed to slide along on the trolley-wire.

It will readily be understood, owing to the wedge shape of the clamp D, the slot for the wire E comes through on the bevel portion at point X. This is sometimes used as a strain-piece by being attached to the trolley-wire, as shown in Fig. 4, and the wire I put through and turned up at the end to prevent pulling out, being anchored to a rigid portion of the construction through turnbuckle F.

I do not care to limit myself to the exact details of construction shown herein.

What I claim as new, and desire to secure by Letters Patent, is—

1. The combination of a trolley-wire, splice on such trolley-wire, tapered clamps each side of said splice, and a metallic connection, as E, between such clamps.

2. The combination of two trolley-wires approaching each other, a coupling substantially larger than the trolley-wires for resisting the strain and coupling the wires, two tapered clamps located one each side of the coupling, and a metallic connection or bridge-piece connecting the clamps.

3. The combination of two trolley-wires approaching each other, an adjustable coupling substantially larger than the trolley-wires for resisting the strain and coupling the wires, two tapered clamps located one each side of the coupling, and a metallic connection or bridge-piece connecting the clamps.

4. The combination of two trolley-wires approaching each other, an adjustable coupling substantially larger than the trolley-wires for resisting the strain and coupling the wires, one tapered clamp rigidly attached to the wire upon one side of the coupling, and another tapered clamp on the other side of the coupling, arranged to slide upon the wire.

ELMER A. SPERRY.

Witnesses:
  HERBERT E. GOODMAN,
  CHAS. A. PRATT.